United States Patent
Lasson

(10) Patent No.: US 9,783,193 B2
(45) Date of Patent: Oct. 10, 2017

(54) METHOD FOR CONTROLLING A SECONDARY ENERGY STORAGE

(75) Inventor: Anders Lasson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 34 days.

(21) Appl. No.: 13/701,434

(22) PCT Filed: Jun. 2, 2010

(86) PCT No.: PCT/SE2010/000151
§ 371 (c)(1),
(2), (4) Date: Dec. 3, 2012

(87) PCT Pub. No.: WO2011/152763
PCT Pub. Date: Dec. 8, 2011

(65) Prior Publication Data
US 2013/0066510 A1    Mar. 14, 2013

(51) Int. Cl.
*B60W 20/50* (2016.01)
*B60W 10/08* (2006.01)
(Continued)

(52) U.S. Cl.
CPC ........... *B60W 20/50* (2013.01); *B60L 3/0084* (2013.01); *B60L 3/04* (2013.01); *B60W 10/06* (2013.01);
(Continued)

(58) Field of Classification Search
CPC .... B60W 10/00; B60W 20/50; B60W 50/038; B60W 10/26; B60W 10/06; B60W 2710/0644; B60W 20/00; B60W 10/08; B60W 50/0205; B60W 2710/242; B60L 3/0084; B60L 3/04; Y10S 903/93; F16H 2061/126

See application file for complete search history.

(56) References Cited

U.S. PATENT DOCUMENTS 6,329,772 B1    12/2001    Ochiai et al.
6,488,107 B1    12/2002    Ochiai et al.
(Continued)

FOREIGN PATENT DOCUMENTS

EP    1157873 A2    11/2001
WO    2010050858 A1    5/2010

OTHER PUBLICATIONS

International Search Report (Jan. 27, 2011) for corresponding International application No. PCT/SE201 0/000151.
(Continued)

*Primary Examiner* — Mussa A Shaawat
*Assistant Examiner* — Michael Kerrigan
(74) *Attorney, Agent, or Firm* — WRB-IP LLP

(57) ABSTRACT

A method is provided for controlling a hybrid vehicle in an emergency situation. The hybrid vehicle includes an internal combustion engine, a rechargeable electric energy storage system, and an electrical motor drive system. The method includes detecting a failure of a control unit for controlling the electrical motor drive system, disconnecting the rechargeable electric energy storage system from the hybrid vehicle, limiting the maximum speed of the internal combustion engine from a first RPM value to a second RPM value. An apparatus is also provided for controlling a hybrid vehicle in an emergency situation.

13 Claims, 4 Drawing Sheets

(51) Int. Cl.
    *B60L 3/00*           (2006.01)
    *B60L 3/04*           (2006.01)
    *B60W 10/06*         (2006.01)
    *B60W 10/26*         (2006.01)
    *B60W 50/038*       (2012.01)
    *B60W 20/00*        (2016.01)
    *F16H 61/12*         (2010.01)
    *B60W 50/02*         (2012.01)

(52) U.S. Cl.
    CPC ............ *B60W 10/08* (2013.01); *B60W 10/26* (2013.01); *B60W 50/038* (2013.01); *B60W 20/00* (2013.01); *B60W 50/0205* (2013.01); *B60W 2710/0644* (2013.01); *B60W 2710/242* (2013.01); *F16H 2061/126* (2013.01); *Y10S 903/93* (2013.01)

(56) References Cited

U.S. PATENT DOCUMENTS

2003/0102673 A1*   6/2003   Nada ........................... 290/40 C
2003/0137275 A1    7/2003   Suzuki et al.
2009/0243554 A1   10/2009   Gu et al.
2010/0109437 A1*   5/2010   Fattic ....................... B60K 6/48
                                                                307/47

OTHER PUBLICATIONS

European Search Report (Jul. 27, 2016) for corresponding European App. 10 852 596.5.

\* cited by examiner

METHOD FOR CONTROLLING A SECONDARY ENERGY STORAGE

BACKGROUND AND SUMMARY

The invention relates to a method for controlling a hybrid vehicle.

Hybrid electric vehicles contain a primary energy source (engine) and a secondary energy storage (Rechargable Electric Energy storage). There is at least one electric motor drives (electric motor, power-electronic frequency converter and control unit) that can provide power to the battery for charging, that can brake regeneratively and/or can assist the engine in providing tractive force to the vehicle.

For hybrid electric vehicles equipped with batteries or ultra-capacitors or the like, often auxiliary systems are powered by the traction battery instead of from a mechanical belt or similar from the engine. The reason for this can be to enable electric-only driving (with engine shut-off), to shut off engine to reduce engine idling and/or to obtain an increased efficiency.

Examples of auxiliaries that can be driven by electric motors are brake air compressors, steering servo oil pumps, 12V or 24V alternators (that can be replaced by static power electronic DC/DC voltage converters, etc.

The battery is equipped with a breaker in order to isolate the battery voltage at shut-off, to de-energize electric circuits at shut-off and to interrupt current at failures.

The electric Motor Drive System (MDS), consists of or comprises an electric motor/machine, a power electronic AC/DC converter and associated Electronic Control Unit (ECU). If the electric motor is permanently magnetized (PM motor), its no-load voltage will be dependant on the motor speed. Usually, the no-load voltage is proportional to the speed.

The problem is that if the MDS control fails, it is not possible to control the electric energy flows and the battery power. Since the electric auxiliary loads continues to consume power, they will deplete the battery state-of-charge, and the battery will have to be disconnected to prevent severe battery damage. When the power supply for the auxiliaries disappears, this can deteriorate the vehicle functionality in an unfavourable way. For example, if the brake air compressor is driven from the battery voltage, battery breaker opening will cause stop-on-road for the vehicle, even if the rest of the powertrain (engine, transmission, etc) is fully operational.

It is desirable to provide a method for prohibiting an accidental stop-on-road for a hybrid vehicle in case of failure in the electric motor drive system.

In a first example embodiment according to an aspect of the invention it is provided a method for controlling a hybrid vehicle in an emergency situation, said hybrid vehicle comprising an internal combustion engine, a rechargeable electric energy storage system, an electrical motor drive system, said method comprising the actions of: detecting a failure of a control unit for controlling the electrical motor drive system, disconnecting the rechargeable electric energy storage system from the hybrid vehicle, limiting the maximum speed of the internal combustion engine from a first RPM value to a second RPM value. Said second value is lower than said first value.

An advantage with said example embodiment of the present invention is that no extra equipment has to be added in order to solve the availability for the auxiliary components.

Another advantage of an aspect of the present invention is that it is lighter, smaller and less expensive compared to existing solutions.

In another example embodiment according to the present invention said method further comprising the step of limiting the minimum speed of the internal combustion engine from a first RPM value to a second RPM value where said second value is higher than said first value.

An advantage of this example embodiment is that it ensures sufficient voltage supply to the auxiliary components with no extra equipment used.

In another example embodiment of the present invention said method further comprising the step of changing the gear choices of an automated transmission from a first set of gear choices, which is used when the control unit controlling the electrical motor drive system is functioning, to a second set of gear choices for the altered upper and/or lower engine speed of the hybrid vehicle when the control unit controlling the electrical motor drive system is not functioning.

An advantage of this example embodiment is that the drivability is secured irrespective of the functionality of the control unit for controlling the electrical motor drive system.

In another example embodiment of the present invention said method further comprising the action of allowing the engine to run under said minimum speed in case of energy reserves provided by at least one auxiliary loads.

An advantage of this example embodiment is that the fuel consumption and exhaust emissions may be kept at a minimum level.

In another aspect of the present invention it is provided a An apparatus for controlling a hybrid vehicle in an emergency situation. Said hybrid vehicle comprising an internal combustion engine, a rechargeable electric energy storage system, an electrical motor drive system. Said apparatus comprising: means for detecting a failure of a control unit for controlling the electrical motor drive system, means for disconnecting the rechargeable electric energy storage system from the hybrid vehicle, means for limiting the maximum speed of the internal combustion engine from a first RPM value to a second RPM value.

In still another aspect of the present invention it is provided a computer program storable on a computer readable medium, comprising a program code for use in an on-board-diagnosis method for controlling a hybrid vehicle in an emergency situation, said method comprising the actions of detecting a failure of a control unit controlling the electrical motor drive system, disconnecting the rechargeable electric energy storage system from the hybrid vehicle, limiting the maximum speed of the internal combustion engine from a first RPM value to a second RPM value.

BRIEF DESCRIPTION OF THE DRAWINGS

The present invention may best be understood from the following detailed description of the embodiments, but not restricted to the embodiments, wherein is shown schematically.

DETAILED DESCRIPTION

Figure 1:
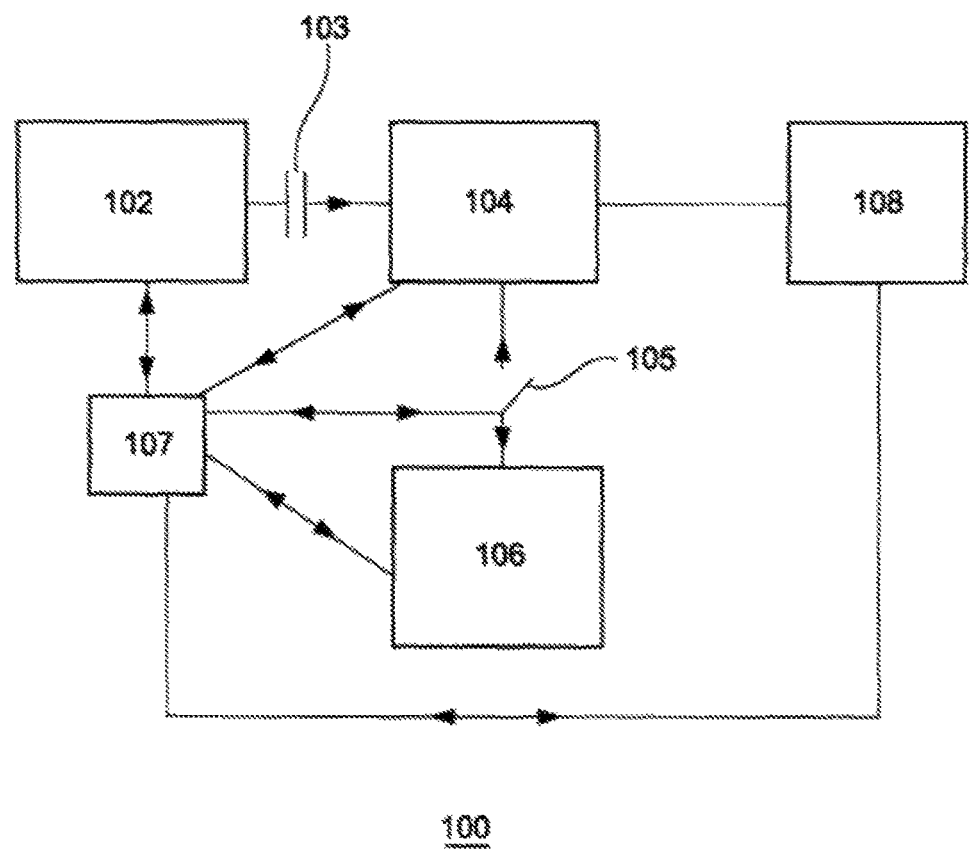
FIG. 1 depicts a schematic example embodiment eta hybrid vehicle according to the present invention.

FIG. 1 depicts an example embodiment of a hybrid vehicle 100 according to the present invention. Said hybrid vehicle 100 comprising an internal combustion engine 102, a rechargeable electric energy storage system 106, an electrical motor drive system 104, a control unit 107, a clutch 103, a switch 105 and a transmission 108.

The internal combustion engine 102 may be a diesel engine, a gasoline engine, a flexifuel engine or a gas engine etc. The engine may have one or a plurality of cylinders with any cylinder volume chosen for the specific circumstances the engine is to be used for.

The clutch 103 may be arranged between the internal combustion engine 102 and the electric motor 04. The clutch 103 may be of a dry clutch type or a wet clutch type. One or a plurality of discs may be used in the clutch 103. Said clutch 103 may be set at least in at least an on or off position. When the clutch 103 is in an on position the rotating force provided by the internal combustion engine 102 is delivered to the electrical motor drive system 104, which in this case is working as a generator. When the clutch 103 is in an off position the internal combustion engine is disconnected from the electrical motor drive system 104, i.e., in this case the electrical motor drive system 104 may be the source of power for propulsion for the hybrid vehicle 100.

The electrical motor drive system 104 may be a permanent-magnet synchronous motor (PMSM) and a AC/DC converter.

The transmission 108 may in a first example embodiment be a final gear without a gearbox. In an alternative example embodiment said transmission 108 is a final gear together with a gearbox, which gearbox could be manual, semiautomatic or automatic.

The rechargeable electric energy storage system 106, may be a battery or a ultra capacitor. The battery may be of nickel-cadmium type or lithium-ion type. The voltage provided by said electric energy storage system 106 may be in the range of 100-1000V, more commonly between 300-800 V and most commonly between 400-600V.

The control unit 107 may control the internal combustion engine 102, the electric motor drive system 104, the electric energy storage system 106 and the transmission 108, which is denoted by the connections between said control unit 107 and the other units in FIG. 1.

In an example embodiment of a method for controlling a hybrid vehicle 100 in an emergency situation according to the present invention, said hybrid vehicle 100 comprising an internal combustion engine 102, a rechargeable electric energy storage system 106, an electrical motor drive system 104, at least one control unit 107 for controlling the electrical motor drive system 104 and the internal combustion engine. Said method comprising the actions of detecting a failure of the control unit 107, disconnecting the rechargeable energy storage system 106 from the hybrid vehicle 100, and limiting the maximum speed of the internal combustion engine 02 from a first RPM value to a second RPM value.

A failure of the control unit 107 may for instance be a failure to control the MDS 104, 300 so that switching devices (e.g. transistors) 302, 304, 306, 308, 310, 312 in a AC/DC converter(s) 320 of the MDS(s) 300 of the HEV tri-states, i.e. at least one switching devices 302, 304, 306, 308, 310, 312 stops switching and becomes disable so that only the diode function (freewheeling diode) of the AC/DC converter 320 remains. The PM motor 314 will together with the freewheeling diodes in the AC/DC converter 320 generate a voltage and/or a current into the DC-bus (the MDS converter will then function as a parasitic diode rectifier).

In that case, the following measures shall be accomplished.
- disconnecting the battery 106 by opening the switch 105
- limiting the maximum speed of the internal combustion engine 102 so that DC-over-voltage is avoided. This will keep the DC-bus voltage under a maximum voltage limit, and thus prevent the auxiliary loads to disable due to over-voltage.

In another example embodiment an optional measure is accomplished namely:
- limiting the minimum speed of the internal combustion engine 102. This will keep the DC-bus voltage over a minimum voltage limit, and thus prevent the auxiliary loads to disable due to under-voltage.

Above engine limitation will have to influence the transmission 108 speed ratio (e.g. gear choices of an automated transmission, e.g. speed ratio in a Continuously Variable Transmission, CVT) for the case there is a controllable transmission in the powertrain.

If the battery 106 is kept connected to the DC-bus, more stringent speed limits for the internal combustion engine 102 can be used to provide battery charging power through the parasitic diode rectifier of the MDS converter. Keeping the battery connected will enable the engine to go under the minimum speed limits for limited time periods, for example during transmission gear shifting.

If there are energy reserves for auxiliary loads 224, for example pressure tanks, the internal combustion engine 102 may run under the minimum speed limits for limited time periods.

The electric motor drive system 104 may be designed to provide an even more suitable no-load voltage to improve DC-bus voltage level during this kind of faults (thus matching the motor no-load voltage to normal engine speeds and DC-bus voltage range).

Well-known state-of-art diagnostic functions of todays converters can be used to detect that the motor converter is not functioning correctly, i.e. if it is faulty and has to be disabled (as described above). For example, the following diagnostic methods can be used:
- main circuit over-temperature (for the power electronics) can be detected by measuring the heat-sink temperature, or by measurement sensors integrated into the IGBT (Insulated-gate bipolar transistor)_power electronic chip. Supervision of the cooling devices (cooling fans, cooling pumps, etc.) can detect (up-coming) converter thermal problems.
- over-currents, for example for phase-leg shoot-through when both upper and lower power switches conduct simultaneously, can be detected by measuring the collector-emitter voltage, see reference. After this the power switches of the converter can be quickly turned off (and the complete converter disabled) to avoid damage due to over-currents.
- The power-switch (e.g. IGBT) driver-circuit function can be supervised via a status signal back to the control circuit. This status signalling may include check of driver-circuit supply voltage. Also, if the driver-circuit compares the requested on/off-signal from the control circuit (microprocessor) with the actual power switch voltage (e.g. the IGBT collector-emitter voltage) it is possible to detect if the driver works as intended or not, which can be indicated as a status signal.

By implementing a model of the electrical machine 204 and its states (currents, etc.) in the controlling microprocessor, and comparing the computed motor state with the actual motor state, it is possible to detect converter malfunction.

Figure 2:
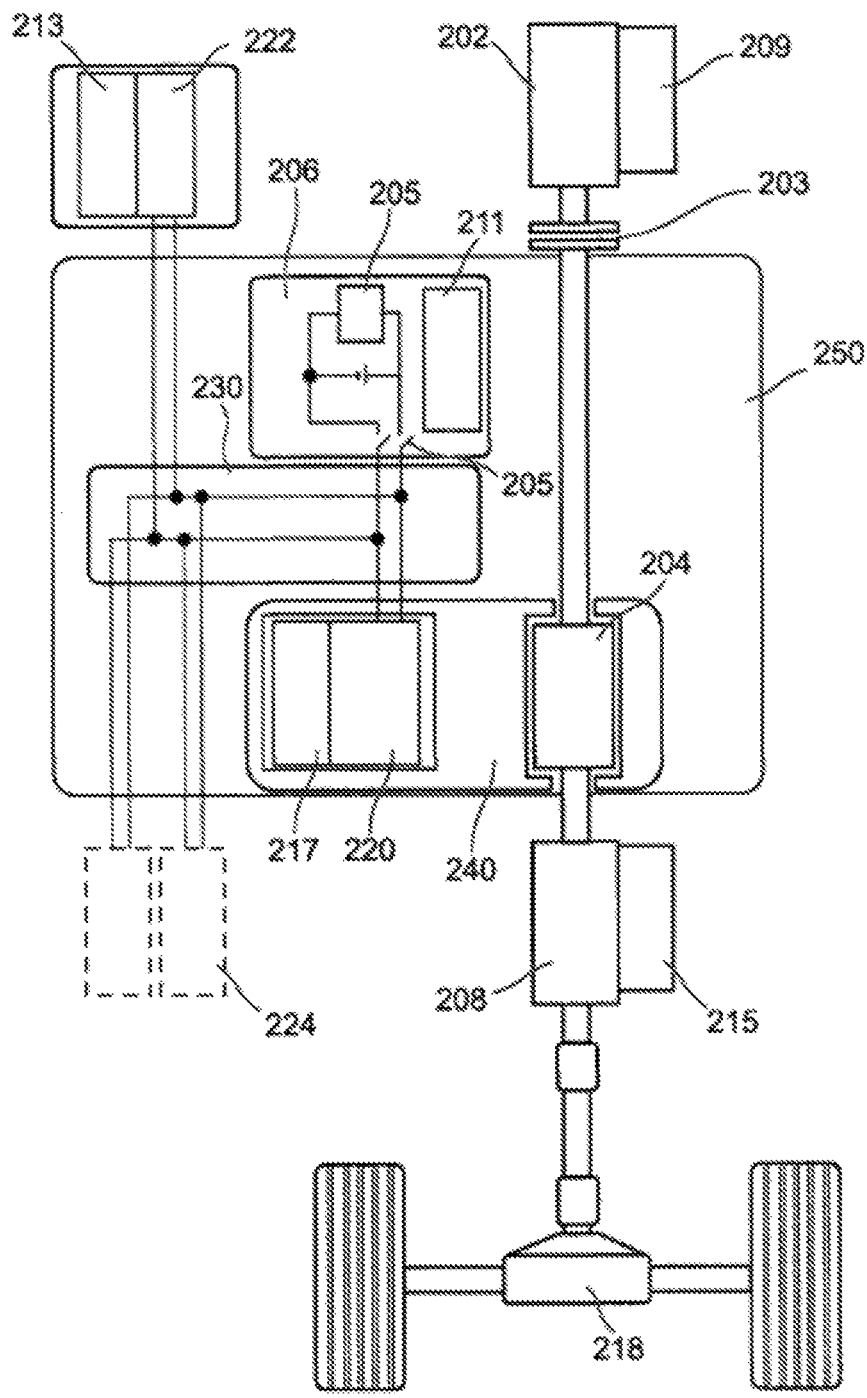
FIG. 2 depicts a somewhat more detailed example embodiment of a hybrid vehicle according to the present invention.

FIG. 2 depicts another example embodiment of a hybrid vehicle 200 according to the present invention. Said hybrid vehicle 200 comprising an internal combustion engine 202, a rechargeable electric energy storage system 206, an electrical machine 204, control units 209, 211, 213, 215, 217, a clutch 203, a switch 205 and a transmission 208, 218, inverter 220, power electronics 222, electric auxiliary 224.

The electric machine 204, the inverter 220, and the control unit 217 for the inverter can be defined as a motor drive system (DS) 240. In the example embodiment the electric machine 204 is fixedly mounted on the shaft connectable between the internal combustion engine and the gearbox 208/final gear 218.

A hybrid electrical vehicle junction box (HJB) 230 may connect the battery via switch 205 to the electric auxiliary units 224 and to the DC-DC power electronics 222 and control unit 213 for the DC-DC power electronics over a DC-bus. The battery 206 may comprise an isolation resistance detector (IRD) 205 for detecting inter alia a failure of the isolation of the battery 206 to the chassis of the hybrid electrical vehicle 200.

Engine ECU 209 may control the diesel engine, for instance the amount of injected fuel and upper/lower RPM limits. A Controller Area Network (CAN) is a communication bus between for instance MDS and ECU which may be used for transporting information to decrease fuel injection which in turn will decrease the RPM of the engine.

The diagnostic functions for determining that the motor converter is not functioning correctly may be the same as discussed in relation to the embodiment disclosed in FIG. 1.

Figure 3:
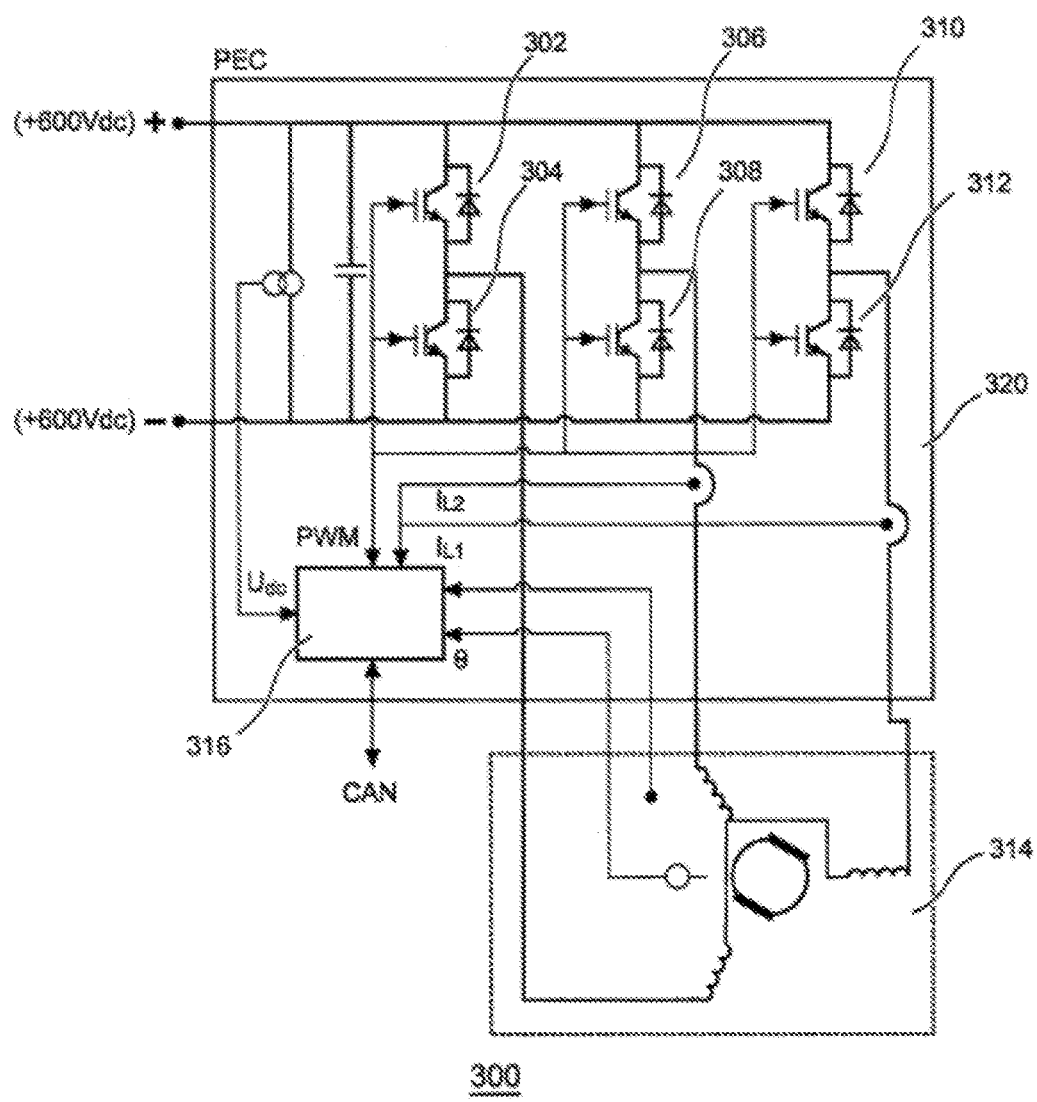
FIG. 3 depicts an example embodiment of an electric motor drive system (MDS).

FIG. 3 illustrates an example embodiment of an electric motor drive system (MDS) comprising en electric motor 314 and a power-electronic frequency converter (PEC) 320. Said electric motor/machine 314 may be a permanently magnetized (PM) electric motor. Said PEC 320 may comprise an electronic control unit (ECU) called MCU (Motor drive system eCU). Said PEC may further comprise a set of switches in the form of transistors 302, 304, 306, 308, 310, 312. Said MCU receives information about the status of the switches 302, 304, 306, 308, 310, 312 on a separate circuit provided to a separate inlet of the MCU. Said MCU also receives information about the current DC voltage provided by the electrical machine and transformed to a direct current from an alternating current by the set of switches 302, 304, 306, 308, 310, 312. The MCU may further receive information about the temperature of the electrical motor. Said MCU may also receive information about the rotor position in the electrical machine 314 from a resolver (position sensor) which later on may be used for determining/controlling the torque and current provided by the electrical machine 314.

Figure 4:
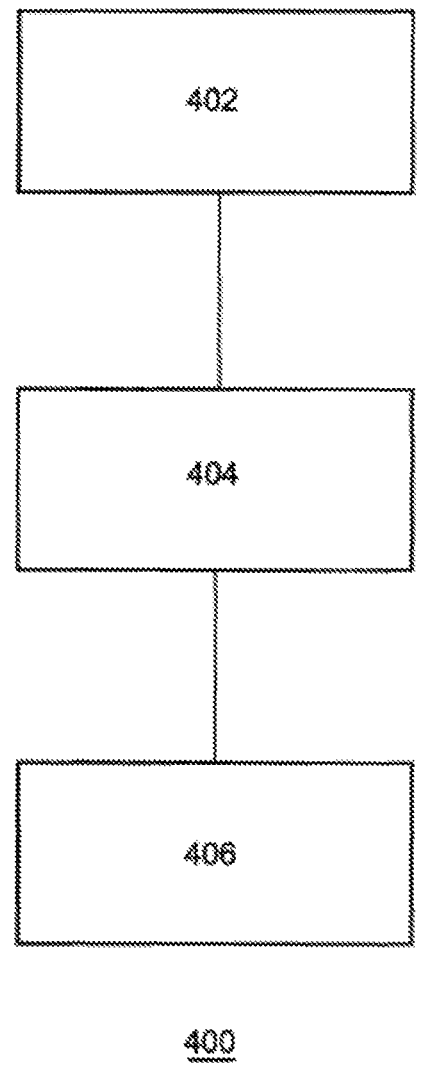
FIG. 4 illustrates a flowchart of an example embodiment of a method for controlling a hybrid vehicle in an emergency situation according to the present invention.

FIG. 4 illustrates a flowchart of an example embodiment of a method for controlling a hybrid vehicle in an emergency situation according to the present invention.

In a first step 402 a detection of a failure of a control unit for controlling the electrical motor drive system is performed. The detection can be made according to any of the method as described above. The failure of the control unit may be that one or a plurality of the switching devices 302, 304, 306, 308, 310, 312 is not working properly, i.e., no switching action meaning that there is only a diode function left of the switching device 302, 304, 306, 308, 310, 312.

In the next step 404 the rechargeable energy storage system is disconnected from the hybrid vehicle. This is done to prevent discharging and severe damage to the rechargeable energy storage system, which may be a battery or capacitor as described above. The disconnection may be performed by a simple switch denoted 105 in FIG. 1 and 205 in FIG. 2.

In a third step 406 the maximum speed of the internal combustion engine is limited from a first RPM value to a second RPM value where said second RPM value is lower than said first RPM value. Once the failure of the control unit is detected the control unit for the internal combustion engine receives a commando for changing the maximum RPM value from said first RPM value to said second RPM value. The restriction of the maximum RPM of the engine will ensure that the auxiliary units do not receive too much voltage which may case an electrical failure.

In yet an example embodiment according to the present invention a minimum RPM value may be changed from a first RPM value to a second RPM value, where said first RPM value is lower than said second RPM value. This will ensure that the electric motor drive system will deliver sufficient power to the auxiliary units such as hydraulic and/or air pumps for the breaking system, coolant air fans, coolant pumps, fuel pumps etc which in turn will ensure functionality although the electric motor drive system is not fully functioning and the battery is disconnected.

The invention claimed is:

1. A method for controlling a hybrid vehicle in an emergency situation, the hybrid vehicle comprising an internal combustion engine, a rechargeable electric energy storage system, an electrical motor drive system, and at least one electric auxiliary connected to the electrical motor drive system, the method comprising:
    detecting a failure of a control unit controlling the electrical motor drive system,
    disconnecting the rechargeable energy storage system from the electrical motor drive system, and
    limiting the maximum speed of the internal combustion engine from a first RPM value to a second RPM value, including selecting the second RPM value to be lower than the first RPM value and sufficiently low to avoid providing the electric auxiliary with too much voltage when powered by the electric motor drive system,
    wherein the rechargeable energy storage system is disconnected from the electrical motor drive system upon detecting the failure of the control unit, and the maximum speed of the internal combustion engine is limited from a first RPM value to a lower second RPM value upon detecting the failure of the control unit, and wherein a minimum speed of the internal combustion engine is limited from a first minimum RPM value to a second minimum RPM value, the second minimum RPM value being higher than the first minimum RPM value, upon detecting the failure of the control unit, the second minimum RPM value being selected so as to provide sufficient voltage supply to ensure functionality of the at least one electric auxiliary.

2. The method according to claim 1, wherein the failure is at least one malfunctioning switching device in a AC/DC converter in the control unit controlling the electrical motor drive system.

3. The method according to claim 1, further comprising changing the gear choices of an automated transmission from a first set of gear choices, which is used when the control unit controlling the electrical motor drive system is functioning, to a second set of gear choices for the altered upper and/or lower engine speed of the hybrid vehicle when the control unit controlling the electrical motor drive system is not functioning.

4. The method according to claim 1, further comprising allowing the engine to run under the minimum speed when energy reserves are provided by the at least one electric auxiliary.

5. A non-transitory computer readable medium, comprising program code for use in an on-board-diagnosis method for controlling a hybrid vehicle in an emergency situation according to claim 1.

6. The method according to claim 1, wherein the maximum speed of the internal combustion engine is limited from the first RPM value to the second RPM value, upon detecting the failure of the control unit.

7. The method according to claim 6, wherein the second RPM value is larger than the second minimum RPM value.

8. An apparatus for controlling a hybrid vehicle in an emergency situation, the hybrid vehicle comprising an internal combustion engine, a rechargeable electric energy storage system, an electrical motor drive system, and at least one electric auxiliary connected to the electrical motor drive system, the apparatus comprising:
   means for detecting a failure of a control unit for controlling the electrical motor drive system,
   means for disconnecting the rechargeable electric energy storage system from the electrical motor drive system, and
   speed limiting means for limiting the maximum speed of the internal combustion engine from a first RPM value to a lower second RPM value, wherein the second RPM value is sufficiently low to avoid providing the electric auxiliary with too much voltage when powered by the electric motor drive system,
   wherein the disconnecting means is configured to disconnect the rechargeable electric energy storage system from the electrical motor drive system and the limiting means limits the maximum speed of the internal combustion engine from the first RPM value to the second RPM value upon the detecting means detecting the failure of the control unit, and wherein the speed limiting means is configured to limit a minimum speed of the internal combustion engine from a first minimum RPM value to a second minimum RPM value, the second minimum RPM value being higher than the first minimum RPM value, upon the detecting means detecting the failure of the control unit, the second minimum RPM value being selected so as to provide sufficient voltage supply to ensure functionality of the at least one electric auxiliary.

9. The apparatus according to claim 8, wherein the failure is at least one malfunctioning switching device in a AC/DC converter in the control unit for controlling the electrical motor drive system.

10. The apparatus according to claim 9, further comprising means for changing the gear choices of an automated transmission from a first set of gear choices, which is used when the control unit controlling the electrical motor drive system is functioning, to a second set of gear choices for the altered upper and/or lower engine speed of the hybrid vehicle when the control unit controlling the electrical motor drive system is not functioning.

11. The apparatus according to claim 8, further comprising means for allowing the engine to run under the minimum speed when energy reserves are provided by at the least one electric auxiliary.

12. The apparatus according to claim 8, wherein the speed limiting means limits the maximum speed of the internal combustion engine from the first RPM value to the second RPM value, the second RPM value being lower than the first RPM value, upon detecting the failure of the control unit.

13. The apparatus according to claim 12, wherein the second RPM value is larger than the second minimum RPM value.

* * * * *